United States Patent
Liu et al.

(10) Patent No.: US 10,108,031 B2
(45) Date of Patent: Oct. 23, 2018

(54) SUBSTRATE DETECTION APPARATUS AND PROTRUSION HEIGHT DETECTION METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Guilin Liu, Beijing (CN); Jingjing Li, Beijing (CN); Xiujuan Cui, Beijing (CN); Juan Li, Beijing (CN); Hongyan Zhang, Beijing (CN); Shanshan Yu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 230 days.

(21) Appl. No.: 14/912,909

(22) PCT Filed: Aug. 12, 2015

(86) PCT No.: PCT/CN2015/086752
§ 371 (c)(1),
(2) Date: Feb. 18, 2016

(87) PCT Pub. No.: WO2016/155190
PCT Pub. Date: Oct. 6, 2016

(65) Prior Publication Data
US 2017/0038615 A1 Feb. 9, 2017

(30) Foreign Application Priority Data
Mar. 30, 2015 (CN) .......................... 2015 1 0145225

(51) Int. Cl.
*B24B 49/00* (2012.01)
*G01B 5/02* (2006.01)
(Continued)

(52) U.S. Cl.
CPC ............ *G02F 1/1309* (2013.01); *B24B 49/00* (2013.01); *G01B 5/02* (2013.01); *G01B 21/02* (2013.01); *G02F 1/13* (2013.01)

(58) Field of Classification Search
CPC .......... G02F 1/1309; G01B 5/02; B24B 49/00
(Continued)

(56) References Cited

U.S. PATENT DOCUMENTS

2009/0055124 A1    2/2009   Herchen et al.

FOREIGN PATENT DOCUMENTS

CN          2896217          5/2007
CN          2896217 Y        5/2007
(Continued)

OTHER PUBLICATIONS

International Search Report and Written Opinion with English Language Translation, dated Dec. 21, 2015, Application No. PCT/CN2015/086752.
(Continued)

*Primary Examiner* — Robert Rose
(74) *Attorney, Agent, or Firm* — Womble Bond Dickinson (US) LLP

(57) ABSTRACT

The present invention relates to the technical field for detecting a display substrate, and discloses a substrate detection apparatus and a protrusion height detection method. The substrate detection apparatus comprises a carrier configured to carry a substrate to be detected as well as a sensor bracket, a height measuring sensor is disposed at one end of the sensor bracket, the height measuring sensor is of a cone structure, and a diameter of an end face, which (Continued)

is configured to detect the substrate to be detected, of the height measuring sensor is smaller than that of the other end face. The substrate detection apparatus and the protrusion height detection method can solve problems such as inaccurate measurement and inaccurate calculation for a height of a protrusion defect on a color filter substrate.

10 Claims, 2 Drawing Sheets

(51) Int. Cl.
    *G02F 1/13*     (2006.01)
    *G01B 21/02*     (2006.01)

(58) Field of Classification Search
    USPC .................................. 451/5, 28, 41, 8, 9, 10
    See application file for complete search history.

(56) References Cited

FOREIGN PATENT DOCUMENTS

| | | |
|---|---|---|
| CN | 103003659 | 3/2013 |
| CN | 103003659 A | 3/2013 |
| CN | 202928496 | 5/2013 |
| CN | 202928496 U | 5/2013 |
| CN | 103940366 | 7/2014 |
| CN | 103940366 A | 7/2014 |
| CN | 104698632 | 6/2015 |

OTHER PUBLICATIONS

Office Action in Chinese Application No. 201510145225.0 dated Aug. 11, 2017, with English translation.
Office Action in Chinese Application No. 201510145225.0 dated Feb. 16, 2017, with English translation. 7 pages.
"Decision on Rejection," CN Application No. 201510145225.0 (dated Jan. 10, 2018).

SUBSTRATE DETECTION APPARATUS AND PROTRUSION HEIGHT DETECTION METHOD

RELATED APPLICATIONS

The present application is the U.S. national phase entry of PCT/CN2015/086752, with an international filing date of Aug. 12, 2015, which claims the benefit of Chinese Patent Application No. 201510145225.0, filed on Mar. 30, 2015, the entire disclosures of which are incorporated herein by reference.

TECHNICAL FIELD

The present invention relates to the technical field for detecting a display substrate, and particularly relates to a substrate detection apparatus and a protrusion height detection method.

BACKGROUND ART

A liquid crystal display panel mainly comprises a TFT (Thin Film Transistor) array substrate and a color filter (hereinafter simply designated as CF) substrate which are molded in a registration manner, as well as liquid crystals and a driver module, wherein a turning direction of the liquid crystal molecules is controlled by means of a magnitude of an electric field so as to realize color display. In a process of the liquid crystal panel, a color filter layer mainly plays a role of color development.

In a process for producing the color filter substrate, various defect points, especially protrusion defects with heights, are inevitably caused, which easily result in poor bright points after the substrate registration. To eliminate the protrusion defects, the prior art generally employs a defect height measuring sensor to locate the protrusion defect points, and eliminates protrusions in a grinding manner. A disadvantage is that a measuring range of an existing defect height measuring sensor is relatively large, and a defect point locating precision is relatively poor. As a requirement for a resolution of a liquid crystal display in the market at present is increasingly higher, it is required that a pixel on the color filter substrate is designed smaller and smaller, and post spacers (hereinafter simply designated as PS) on the pixel are more and more intensive. These PSs are mainly used for support, and are configured to provide support between the TFT array substrate and the CF substrate to maintain an adequate space to be filled with liquid crystals. For a high-resolution display product, measuring the height of the defects is more inaccurate due to interference from the intensive PSs.

SUMMARY OF THE INVENTION

To solve problems such as inaccurate measurement and inaccurate calculation for a height of a protrusion defect on a color filter substrate, an embodiment of the present invention provides a substrate detection apparatus and a protrusion height detection method. The technical solution is detailed as follows.

In one aspect according to embodiments of the present invention, there is provided a substrate detection apparatus, comprising a carrier configured to carry a substrate to be detected as well as a sensor bracket, wherein a height measuring sensor is disposed at one end of the sensor bracket, the height measuring sensor is of a cone structure, and a diameter of an end face, which is configured to detect the substrate to be detected, of the height measuring sensor is smaller than that of the other end face.

The above substrate detection apparatus provided according to embodiments of the present invention comprises a carrier configured to carry the substrate to be detected as well as a sensor bracket, wherein a height measuring sensor which is of the cone structure is disposed at one end of the sensor bracket, and the diameter of an end face, which is configured to detect the substrate to be detected, of the height measuring sensor is smaller than that of the other end face. Measurement for a height of a defect with such a height measuring sensor is of a point-contact type. After a defect point is found, the height measuring sensor can directly perform a point-contact measurement on a center position of the defect point to obtain a measured height. Compared with the prior art, the technical solution of the present invention can remarkably improve a measurement accuracy for the height of the protrusion defect. Particularly, for a color filter intensive post spacer product, this solution effectively solves problems such as inaccurate measurement and inaccurate calculation for the height of the protrusion defect on the color filter substrate.

According to embodiments of the present invention, the end face, which is configured to detect the substrate to be detected, of the height measuring sensor is a spherical surface, and a radius of the spherical surface is 5-20 um. With such an end face and its radius, the accuracy and the precision for measuring and calculating the height of a protrusion are further improved.

According to embodiments of the present invention, at least one reference point is disposed on the carrier so as to perform zero height calibration on the height measuring sensor by using the height of the reference point as a preset reference height. By disposing the at least one reference point and using its height as a reference height, accurate definition to the reference height is facilitated, and thereby the accuracy and the precision for measuring and calculating the height of the protrusion are further improved.

In another aspect according to embodiments of the present invention, there is provided a protrusion height detection method, which employs the substrate detection apparatus as described above, the method comprising:

measuring a height of a protrusion with the substrate detection apparatus to obtain a measured height; and obtaining an actual height of the protrusion according to the measured height and a preset reference height.

Measurement for a height of a protrusion defect is of a point-contact type when the height of the protrusion is detected with the above substrate detection apparatus of the present invention. After a defect point is found, the height measuring sensor can directly perform point-contact measurement on a center position of the defect point to obtain a measured height. Compared with the prior art, the technical solution of the present invention can remarkably improve a measurement accuracy for the height of the protrusion defect. Particularly, for a color filter intensive post spacer product, this solution effectively solves problems such as inaccurate measurement and inaccurate calculation for the height of the protrusion defect on the color filter substrate.

According to embodiments of the present invention, the protrusion height detection method further comprises: before measuring the height of the protrusion, dividing a carrier on which the substrate is placed into a plurality of zones; and respectively measuring a height of a reference point in each zone with the height measuring sensor such that the measured height value for the reference point of the zone in which the protrusion is located is used as a reference height for this zone.

By disposing a plurality of zones and a plurality of corresponding reference points on the carrier as well as using the height of the respective reference point as a reference height for the respective zone, accurate definition to the reference height is facilitated, and thereby the accuracy and the precision for measuring and calculating the height of the protrusion are further improved.

According to embodiments of the present invention, the protrusion height detection method further comprises: when an actual height of the protrusion is greater than or equal to a repair threshold, grinding the protrusion. With a subsequent grinding step, the protrusion defect in a display apparatus is eliminated in time.

According to embodiments of the present invention, the actual height of the protrusion is a difference between the measured height of the protrusion and the reference height. Therefore, the actual height of the protrusion is easily calculated.

BRIEF DESCRIPTION OF THE DRAWINGS

In order to illustrate a technical solution according to embodiments of the present invention more clearly, drawings to be used in the description of the embodiments will be briefly set forth in the following. It is obvious that the drawings in the following description are only related to some embodiments of the present invention. Those ordinarily skilled in the art may obtain other embodiments according to these drawings, without any inventive work.

Figure 1:
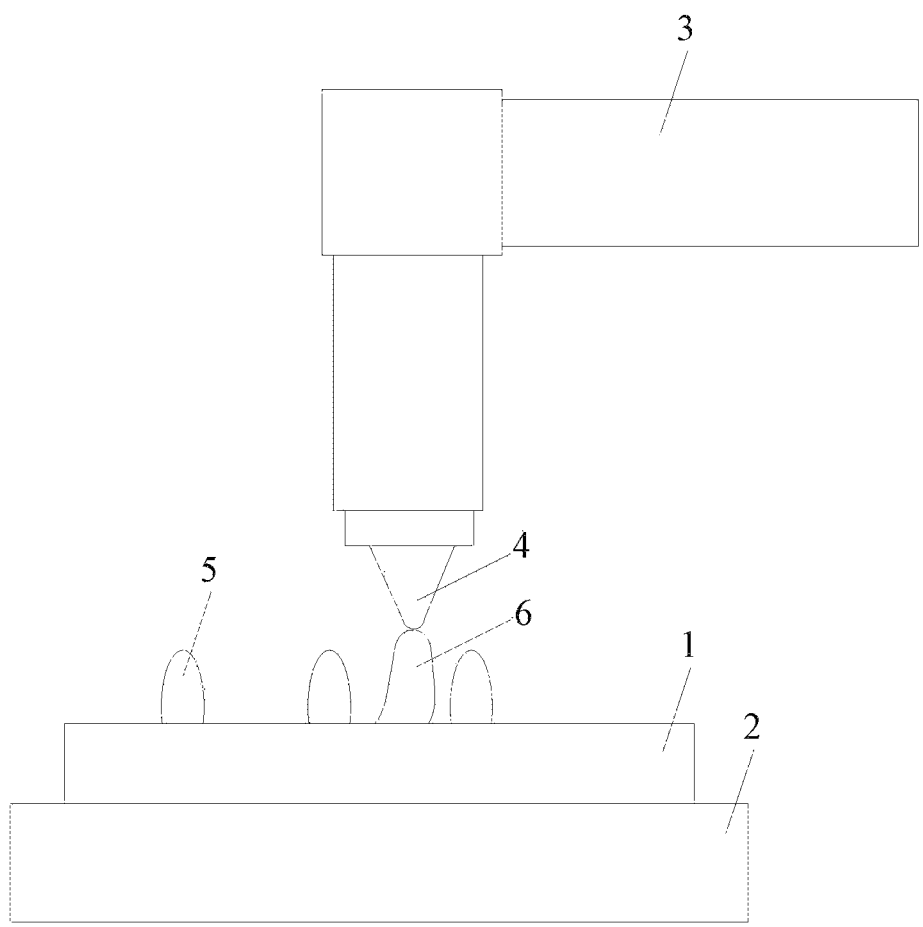
FIG. 1 is a schematic structural view for a substrate detection apparatus provided according to embodiments of the present invention.

REFERENCE NUMERALS 1 substrate to be detected
2 carrier
3 sensor bracket
4 height measuring sensor
5 post spacer
6 protrusion defect
7 reference point.

DETAILED DESCRIPTION OF THE INVENTION

In order to make objects, technical solutions and advantages of the present invention more apparent, an embodiment of the present invention will be further described below in detail in connection with drawings.

As shown in FIG. 1, a substrate detection apparatus provided according to embodiments of the present invention comprises a carrier 2 configured to carry a substrate to be detected 1 as well as a sensor bracket 3, wherein a height measuring sensor 4 is disposed at one end of the sensor bracket 3, the height measuring sensor 4 is of a cone structure, and a diameter of an end face, which is configured to detect the substrate to be detected 1, of the height measuring sensor 4 is smaller than that of the other end face.

The substrate detection apparatus provided according to embodiments of the present invention comprises a carrier configured to carry a substrate to be detected as well as a sensor bracket, wherein a height measuring sensor which is of the cone structure is disposed at one end of the sensor bracket, and the diameter of an end face, which is configured to detect the substrate to be detected, of the height measuring sensor is smaller than that of the other end face. Measurement for a height of a defect with such a height measuring sensor is of a point-contact type. After a defect point is found, the height measuring sensor can directly perform a point-contact measurement on a center position of the defect point to obtain a measured height. Compared with the prior art, a technical solution of the present invention can remarkably improve a measurement accuracy for the height of a protrusion defect. Particularly, for a color filter intensive post spacer product, this solution effectively solves problems such as inaccurate measurement and inaccurate calculation for the height of the protrusion defect on a color filter substrate.

It is noted that the substrate detection apparatus as shown in FIG. 1 is illustrated in a case where the substrate to be detected 1 is an intensive post spacer color filter substrate. In order to clearly illustrate the height detection for the protrusion defect, in FIG. 1, post spacers 5 are disposed on a surface of the substrate to be detected 1 at intervals, the protrusion defect 6 is located between two post spacers 5, and the height measuring sensor 4 aligns with the protrusion defect 6 to measure the height of the protrusion defect 6.

In an existing height measuring sensor, the height measuring sensor is generally of a cylinder structure and has a radius of 250 um. A corresponding defect height measuring method comprises: with a color filter pixel as a reference surface and a defect as a center, performing linear-contact scanning in a left-right equidistant manner to obtain a height measurement result. For the protrusion defect on the intensive post spacer product, the cylindrical height measuring sensor can not contact the reference surface when measuring the height due to large volume and linear contact. Especially, for a defect with a height of a post spacer height plus or minus 0.5 um, because what the cylindrical height measuring sensor actually contacts are post spacers, a relatively flat curve is obtained by scanning, such that an actual height of the protrusion defect can not be accurately measured. At present, a grinding threshold for the protrusion defect on a color filter product is 1.5 um, the height of the defect is calculated according to a measurement result from the cylindrical height measuring sensor, and thereby problems such as excessive grinding and insufficient grinding are easily caused in a product repairing process, and the product quality is seriously affected.

Particularly, in the substrate detection apparatus as shown in FIG. 1, the end face, which is configured to detect the substrate to be detected 1, of the height measuring sensor 4 is a spherical surface, and the radius of the spherical surface is 5-20 um. In an actual application process, the radius of the spherical surface may be selected as required. For example, it may be preferably 10 um. The size of such a spherical surface corresponds to that of a common protrusion defect. Therefore, a precise point-contact measurement can be realized with such a spherical surface structure, and thus a detection precision is ensured.

Figure 2:
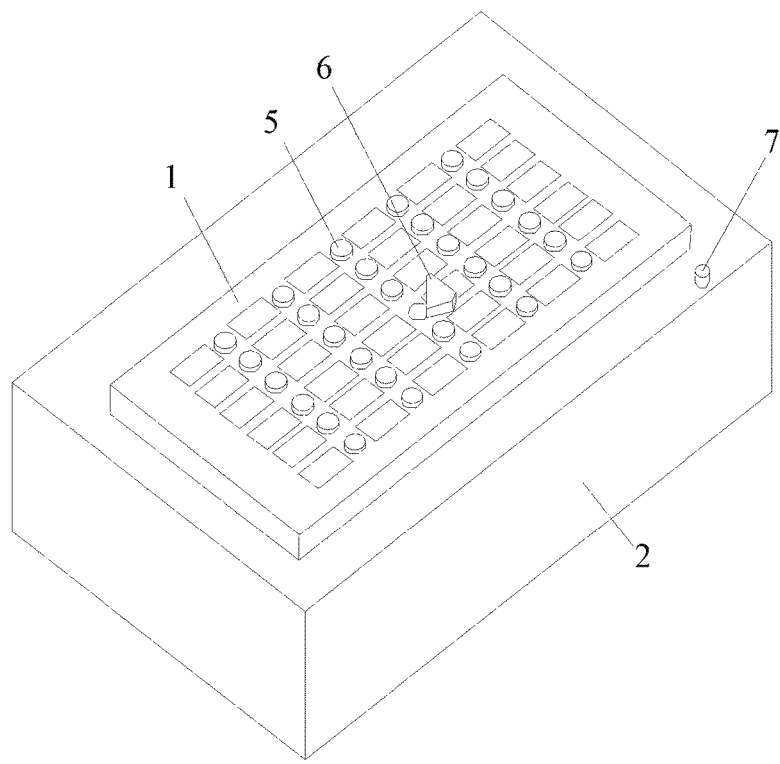
FIG. 2 is a schematic structural view for a carrier in a substrate detection apparatus provided according to embodiments of the present invention.

Further, as shown in FIG. 2, at least one reference point 7 may be disposed on the carrier 2 so as to perform zero height calibration on the height measuring sensor 4 by using the height of the reference point 7 as a preset reference height.

Particularly, the carrier 2 may be divided into a plurality of zones, each zone may correspond to one reference point, and the height of the reference point may be preset according to an actual demand. For example, before detecting the height of the protrusion defect, an actual average height for a certain zone may be set to a reference point height for this zone. Further, one reference point 7 corresponding to this zone may be disposed on the surface of the carrier. In this way, before each measurement for the height of the protrusion defect in a certain zone, the height measuring sensor 4 may align with the reference point 7 of this zone, so that the zero height calibration is completed. Then, the height measuring sensor 4 aligns with the protrusion defect point, and therefore a relative defect height of this defect point may be accurately obtained.

It is noted that the carrier as shown in FIG. 2 is illustrated in a case where the carrier 2 is particularly divided into one complete zone, wherein the complete zone corresponds to one reference point 7. In an actual application process, when an area of the substrate to be detected carried by the carrier 2 is relatively large, the carrier 2 may be divided into a plurality of zones. For example, the carrier 2 may be divided into four zones. Further, four reference points corresponding to four zones are respectively disposed at four corners of the carrier 2. The present invention is not limited thereto.

A protrusion height detection method provided according to embodiments of the present invention employs the substrate detection apparatus as described above, as shown in FIG. 3, the method comprising:

step 303, measuring a height of a protrusion defect with the substrate detection apparatus to obtain a measured height; and step 304, obtaining an actual height of the protrusion defect according to the measured height and a preset reference height.

The protrusion height detection method provided according to embodiments of the present invention employs the substrate detection apparatus, wherein the substrate detection apparatus comprises a carrier configured to carry a substrate as well as a sensor bracket, wherein a height measuring sensor which is of a cone structure is disposed at one end of the sensor bracket, and a diameter of an end face, which is configured to detect the substrate to be detected, of the height measuring sensor is smaller than that of the other end face. Measurement for a height of a defect with such a height measuring sensor is of a point-contact type. After a defect point is found, the height measuring sensor can directly perform a point-contact measurement on a center position of a defect point to obtain a measured height. Compared with the prior art, the technical solution of the present invention can remarkably improve a measurement accuracy for the height of the protrusion defect. Particularly, for a color filter intensive post spacer product, this solution effectively solves problems such as inaccurate measurement and inaccurate calculation for the height of the protrusion defect on a color filter substrate.

Figure 3:
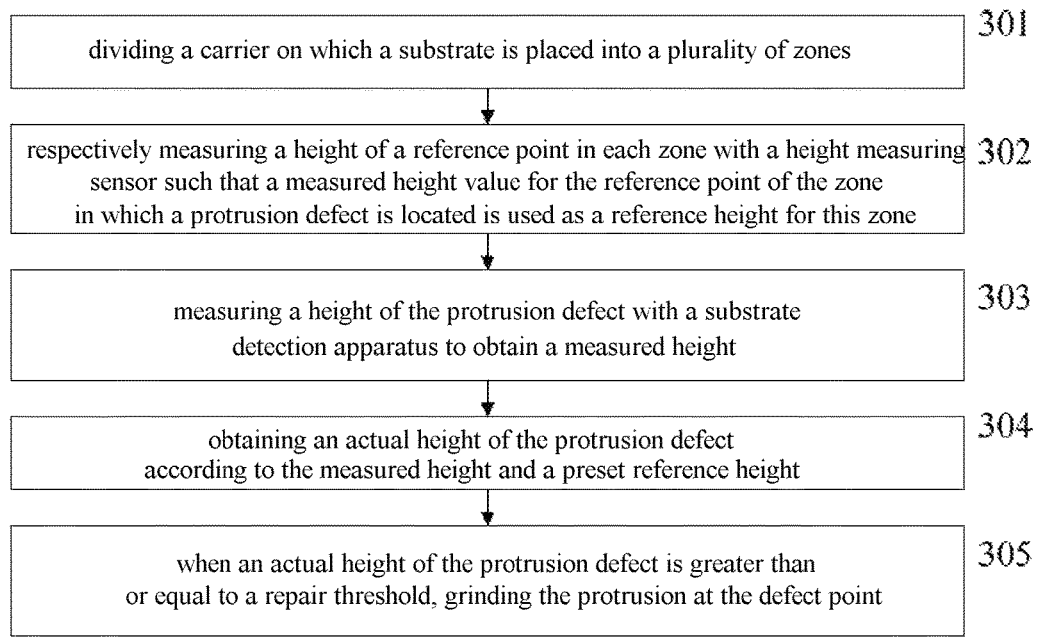
FIG. 3 is a schematic flow chart for a substrate detection method provided according to embodiments of the present invention.

Further, as shown in FIG. 3, the method may also comprise: before measuring the height of the protrusion defect, step 301, dividing a carrier on which the substrate is placed into a plurality of zones; and step 302. respectively measuring a height of a reference point in each zone with the height measuring sensor such that the measured height value for the reference point of the zone in which the protrusion defect is located is used as a reference height for this zone.

Further, as shown in FIG. 3, the method may also comprise:

step 305, when an actual height of the protrusion defect is greater than or equal to a repair threshold, grinding the protrusion of the defect point.

In the prior art, measurement for the height of the defect is generally as follows: a minimum value, which is scanned and measured by the height measuring sensor, in a zone is used as a reference height, and the height of the defect is obtained by subtracting the reference height from the maximum height. Especially, for a defect on the intensive post spacer product, because the height measuring sensor is influenced by post spacers when measuring the height, the height of the defect is inaccurately calculated by means of this calculating method, and therefore problems such as excessive grinding and insufficient grinding are caused in a product repairing process.

According to embodiments of the present invention, the height of the defect is calculated with a zone calculation method in conjunction with a height measuring method by the cone height measuring sensor. Particularly, a reference height is selected for different zones of a platform on which the substrate is placed by using reference points of the height measuring sensor, and an actual height of the protrusion defect is obtained by subtracting the reference height for the respective zone from the measured height measured by the height measuring sensor at the defect. A particular calculation process comprises the steps as follows.

Obtaining the reference height, that is to say, dividing the platform on which the substrate is placed into a plurality of zones, and selecting the reference height for each zone by means of the height measuring sensor. For example, the reference height for zone I is $\Delta X_1$, the reference height for zone II is $\Delta X_2$, the reference height for zone III is $\Delta X_3$, the reference height for zone III is $\Delta X_4$, etc.

Obtaining a measured height measured by the height measuring sensor, that is to say, using a height obtained by performing a point-contact measurement on a center position of the defect directly by the height measuring sensor as a measured height measured by the height measuring sensor.

Calculating the height of the defect, that is to say, obtaining the actual height of the protrusion defect by subtracting the reference height for the respective zone on the platform from the measured height measured by the height measuring sensor. If the defect position is in zone I on the platform, the actual height of the defect is equal to a difference between $H_{measured\ value\ from\ the\ height\ measuring\ sensor}$ and $\Delta X_1$.

The zone calculation method enables a calculation for the height of the defect to be relatively accurate, and therefore, problems such as excessive grinding, insufficient grinding and the like are prevented in a product repairing process.

By using the cone height measuring sensor and the zone calculation method, the interference from intensive post spacers is effectively avoided, and with the accurate calculation for the height of the defect, problems such as excessive grinding, insufficient grinding and the like are prevented in a product repairing process, and therefore the product quality is improved. Measurement for the height of the defect with such a height measuring sensor is of a point-contact type. After a defect point is found, the height measuring sensor can directly perform a point-contact measurement on a center position of the defect point to obtain a measured height. Compared with the prior art, the technical solution of the present invention can remarkably improve a measurement accuracy for the height of the protrusion defect. Particularly, for a color filter intensive post spacer product, this solution effectively solves problems such as inaccurate measurement and inaccurate calculation for the height of the protrusion defect on a color filter substrate.

The forgoing is merely preferred embodiments of the present invention and is not intended to limit the present invention. Any modifications, equivalent substitutions, improvements and the like made within the spirit and principle of the present invention should be included within a protection scope of the present invention.

The invention claimed is:

1. A substrate detection apparatus, comprising:
a carrier configured to carry a substrate to be detected; and
a sensor bracket,
wherein a height measuring sensor is disposed at one end of said sensor bracket, said height measuring sensor is of a cone structure, and a diameter of an end face, which is configured to detect said substrate to be detected, of said height measuring sensor is smaller than that of an opposite end face,
wherein the carrier comprises a plurality of zones, each zone being disposed with one reference point so as to perform zero height calibration on said height measuring sensor by using a height of said reference point as a preset reference height.

2. The substrate detection apparatus according to claim 1, wherein an end face, which is configured to detect said substrate to be detected, of said height measuring sensor is a spherical surface, and a radius of said spherical surface is 5-20 um.

3. A protrusion height detection method, which employs the substrate detection apparatus according to claim 1, said method comprising:
measuring a height of a protrusion with said substrate detection apparatus to obtain a measured height; and
obtaining an actual height of said protrusion according to the measured height and a preset reference height,
wherein the method further comprises respectively measuring a height of a reference point in each zone with said height measuring sensor such that a measured height value for a reference point of said zone in which said protrusion is located is used as a reference height for this zone.

4. The protrusion height detection method according to claim 3, further comprising:
when an actual height of said protrusion is greater than or equal to a repair threshold, grinding said protrusion.

5. The protrusion height detection method according claim 3, wherein an actual height of said protrusion is a difference between the measured height of the protrusion and the reference height.

6. The protrusion height detection method according to claim 3, wherein an end face, which is configured to detect said substrate to be detected, of said height measuring sensor is a spherical surface, and a radius of said spherical surface is 5-20 um.

7. The protrusion height detection method according to claim 3, wherein at least one reference point is disposed on said carrier so as to perform zero height calibration on said height measuring sensor by using a height of said reference point as a preset reference height.

8. The protrusion height detection method according claim 6, wherein an actual height of said protrusion is a difference between the measured height of the protrusion and the reference height.

9. The protrusion height detection method according claim 7, wherein an actual height of said protrusion is a difference between the measured height of the protrusion and the reference height.

10. The protrusion height detection method according claim 4, wherein an actual height of said protrusion is a difference between the measured height of the protrusion and the reference height.

* * * * *